United States Patent [19]

Catt

[11] 3,913,072

[45] Oct. 14, 1975

[54] DIGITAL INTEGRATED CIRCUITS

[76] Inventor: Ivor Catt, Crouch Hall, Redbourn, Hertfordshire, England

[22] Filed: July 23, 1973

[21] Appl. No.: 381,686

[30] Foreign Application Priority Data

Aug. 3, 1972 United Kingdom............... 36365/72

[52] U.S. Cl................................ 340/172.5; 340/173

[51] Int. Cl.$^2$........................................... G06F 1/00

[58] Field of Search.................. 340/172.5, 173 BB; 235/153 AK; 307/213, 303, 279

[56] References Cited

UNITED STATES PATENTS

| | | | |
|---|---|---|---|
| 3,735,368 | 5/1973 | Beausoleil | 340/173 R |
| 3,758,761 | 9/1973 | Henrion | 235/153 AK |

*Primary Examiner*—Raulfe B. Zache
*Attorney, Agent, or Firm*—Robert F. O'Connell

[57] ABSTRACT

In order to eliminate the expense of dicing an integrated circuit into chips, testing the chips, selecting, packaging and retesting the chips, the wafer is left undiced and each chip includes switching and control circuits which enable a chip to be linked to any one of its neighbours. A chain of good chips is built up by sending control signals down the existing part of the chain (which starts with one chip) to cause a new chip to be added to the chain. Test signals are then used to ascertain if the added chip is good. If it is the next chip is added; if not, the chip is disconnected and the control signals utilised to select another neighbouring chip as the added chip. Faulty chips are thus simply by-passed by the chain which is built up of good chips only to form a long shift register for example. Grids of power and clock lines are provided to all chips and a fast data line grid may be used for accessing all chips in a content addressable memory application.

25 Claims, 21 Drawing Figures

DIGITAL INTEGRATED CIRCUITS

This invention relates generally to digital integrated circuits, particularly (but not exclusively) IC memories. The major part, by a factor of 10 or more, of the cost of a memory or other digital circuit fabricated from IC's arises in the manufacturing stages arising subsequent to fabrication of the IC wafer. These stages include dicing the wafer into chips, testing and sorting the chips into good and bad, packaging the good chips and bonding terminals to the chips, testing the packaged chips and assembling and testing a complete circuit from the packaged chips and printed circuit boards.

The object of the present invention is to provide a circuit which utilises a complete, and very much less expensive, solution to the problem of building up the necessary information storing and/or processing capability notwithstanding the fact that, in an IC wafer a substantial proportion of the chip regions are defective.

According to the present invention, there is provided a digital integrated circuit comprising a plurality of undiced regions in a semiconductor wafer, each region having formed thereon a digital circuit adapted to store and/or process digital information and to transfer digital information signals and control signals from at least one set of input connections to one of a plurality of sets of output connections selected by a logical switching circuit included in the digital circuit, the sets of output connections being connected to sets of input connections of a plurality of neighbouring regions, and the logical switching circuit of each region being responsive to certain of the control signals to change the selected set of output connections.

The said regions can be identical regions.

It will be understood that the wafer would conventionally be diced into a plurality of chips, each of which would carry one, or another small number, of the said regions. It will be convenient in what follows, however, to use "chip" synonymously with one region, even although the wafer is actually undiced.

In operation of a circuit according to the invention, a first chip is selected, test (information) signals are applied thereto and the output of the circuit is checked to find if the chip is good or bad. If it is bad another chip is chosen. When a good first chip is found, control signals are used to connect it to a neighbouring second chip and test signals are again used to check the second chip. If the second chip is good, the procedure is extended to a third chip. If the second chip is bad, control signals are used to connect the first chip to a different second chip. In this way a chain of good chips can be built up, bypassing bad chips, and the chain can be built up afresh if a fault develops during use.

The control signals are preferably such that the chain of chips tends to follow a spiral path and the first chip may be near the centre of the wafer so that the chain spirals outwards.

The control signals have to be addressed to the last chip of the chain. The control signals can be distinguished from data signals by a predetermined code included therein and detected by the chips. Each chip can have a bistable flip-flop which is initially set to a first state which allows the chip to respond to a control signal but which is set to a second state when the chip has been connected to a succeeding chip; the chip ignores the control signal when its bistable is in the second state and the control signal is therefore now operative on the succeeding chip. A disadvantage of this procedure is that it complicates the control when it is necessary to back-track to the chip to select another succeeding chip because the first selected succeeding chip turns out to be bad.

It is preferred to incorporate in each control signal an address number which is decremented by each chip traversed and reaches a predetermined number at the addressed chip, which responds accordingly. If the $n^{th}$ chip in the chain is to be addressed, it is convenient to make the address number $n - 1$, to subtract 1 in each chip traversed, and detect the state at the $n^{th}$ chip where such subtraction causes a borrow bit to propagate continously in the direction of increasing significance.

In order to increase the speed of access to chips, the data paths thereon can consist of a plurality of paths in parallel. Alternatively, and preferably, a fast control line can be provided with connections to all chips which can be operated as content addressable memories. To avoid confusion with the chip addresses referred to in the preceding paragraph, the associative addresses accompanying data in the chip data path will always be referred to herein as tag addresses, or simply tags. The addresses sent along the control line to match tags will be called mask addresses, or simply masks. The recirculating contents of the data path of the chips, which path may be referred to as the slow line because the memory cycle time will be of the order of 10 ms, consist of a succession of word cells, each containing a data word and its associated tag. A word cell may fill a whole chip but will preferably occupy only a fraction of a chip. For example, a chip may accommodate 1200 bits comprising 25 word cells, each of 48 bits.

The control line may be called the fast line since it has rapid access to all word cells. When a mask sent on the fast line matches a tag in the slow line, provision is made at the word cell where the match takes place to perform an operation such as READ (i.e. read slow line data into fast line), WRITE (i.e. replace slow line data by data sent on the fast line), or EXCHANGE (i.e. read slow line data into the fast line and write the fast line data into the slow line).

The amount of power dissipated by awafer is substantial. Although the wafer can be encapsulated and provided with forced cooling, it is preferred to immerse the naked wafer in a liquid coolant, as suggested, for example, in Dielectric Bath Promotes Togetherness in I.C.'s, by R. R. Weirather and T. C. Go, Electronics, Apr. 17, 1967, pp 123–130.

It will be realised that the invention requires a proportion of the circuitry available on a chip to be assigned to performance of the logical control functions and so to be unavailable for the data storing or processing operation of the chip. However, in view of the vast amount of logic which can be provided cheaply on a chip, the loss of a proportion thereof, say 10 or 20 percent, for control functions is not a serious disadvantage.

The invention will be described in more detail, by way of example, with reference to the accompanying drawings, in which.

Figure 13:
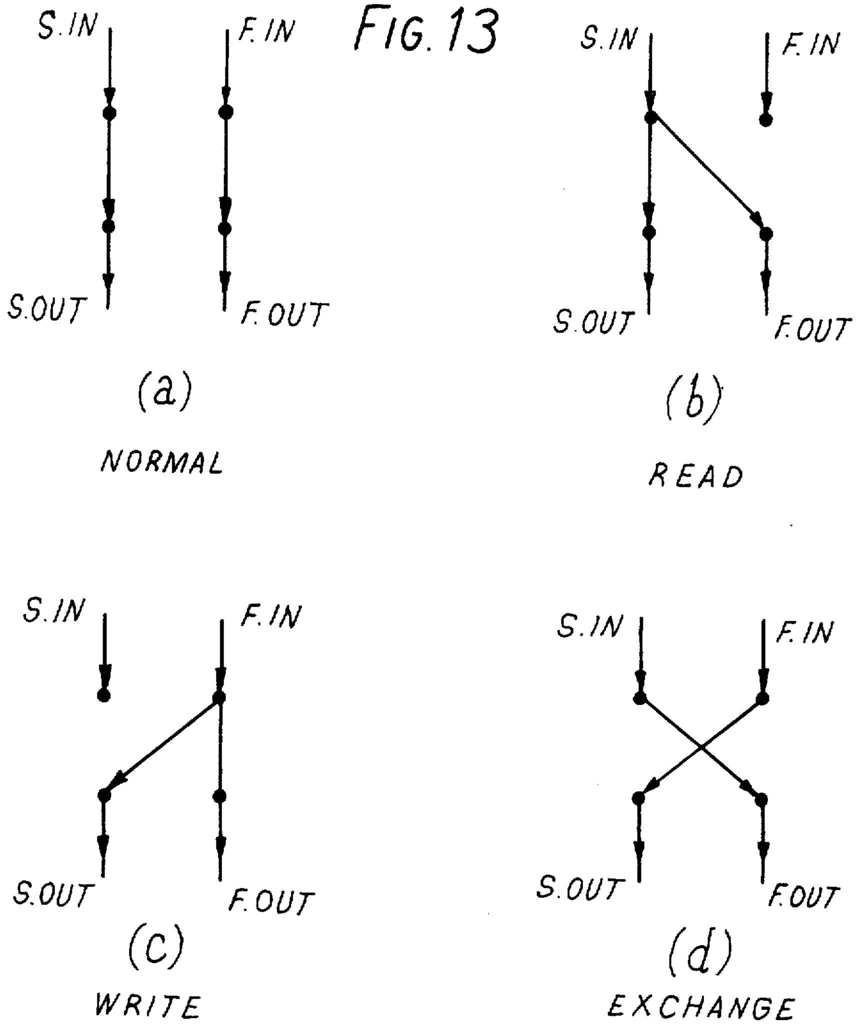
Figure 14:
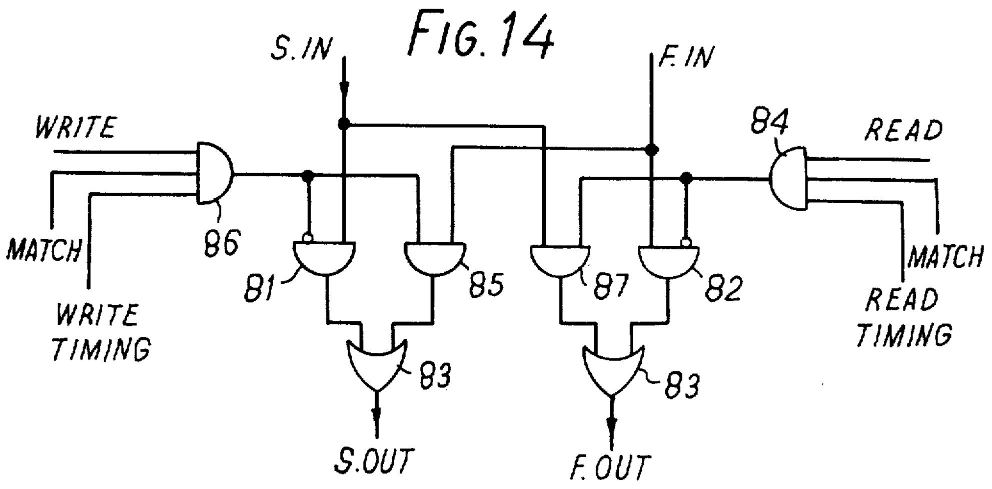
Figures 15, 17:
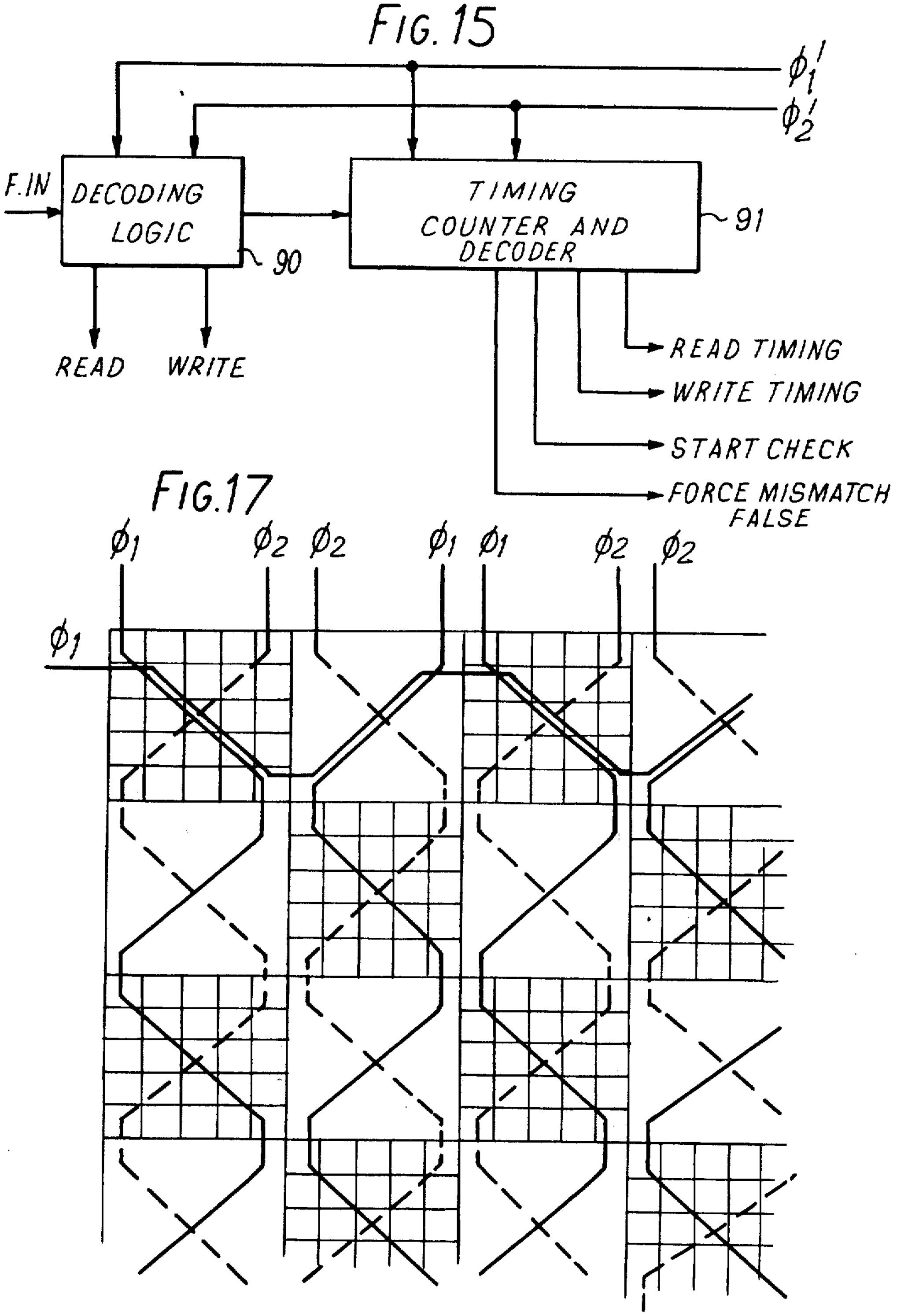
Figure 16:
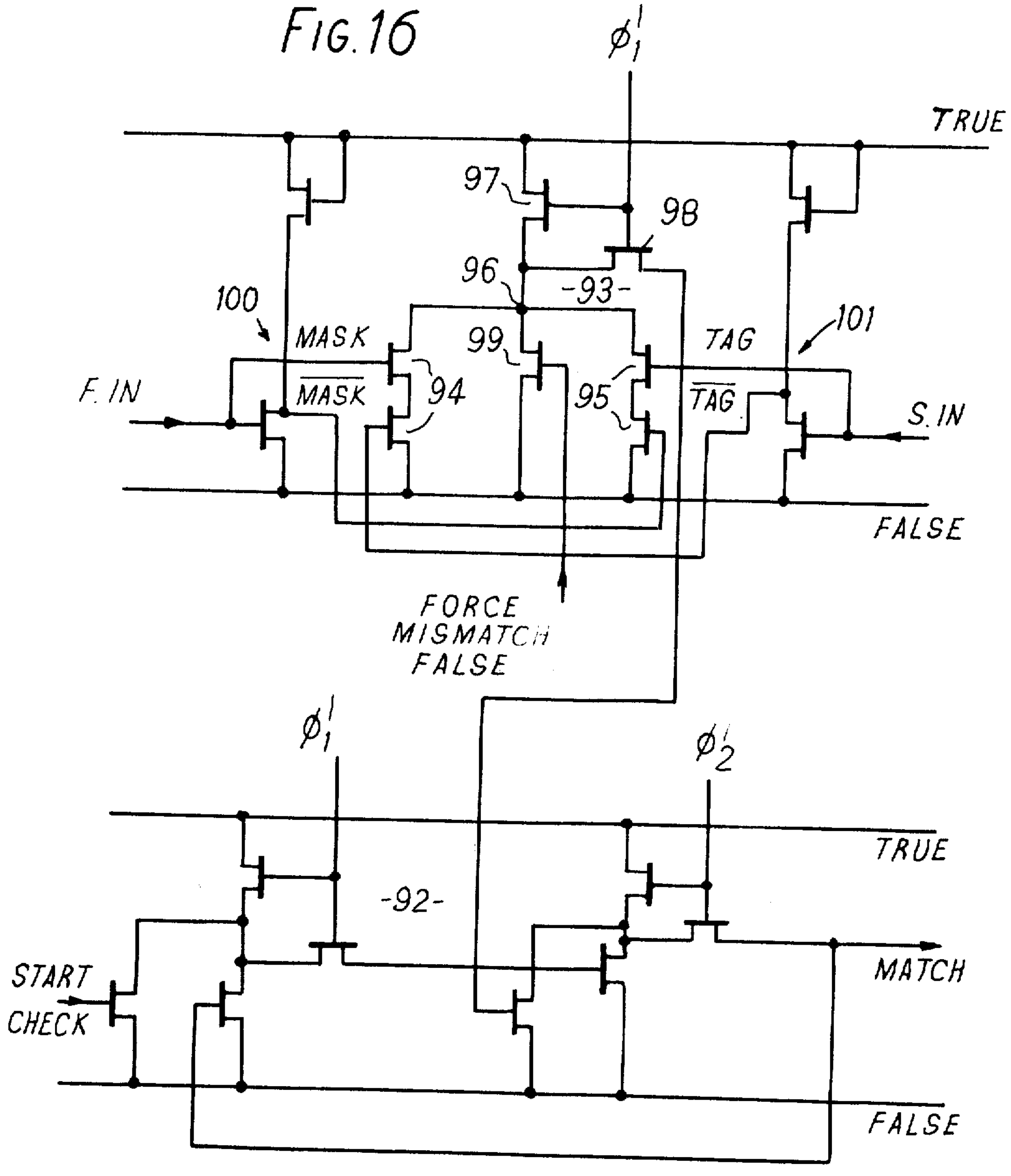

FIGS. 13(*a*), (*b*), (*c*) and (*d*) illustrate four different configurations of a data switch controlling communication between the fast line and the slow line (or data path);

FIG. 14 illustrates the construction of a data switch;

FIG. 15 shows control logic common to all word cells of a chip;

FIG. 16 illustrates a mask-tag match circuit for one word cell;

FIG. 17 illustrates the preferred routing of clock lines to the chips, and

Figure 18:
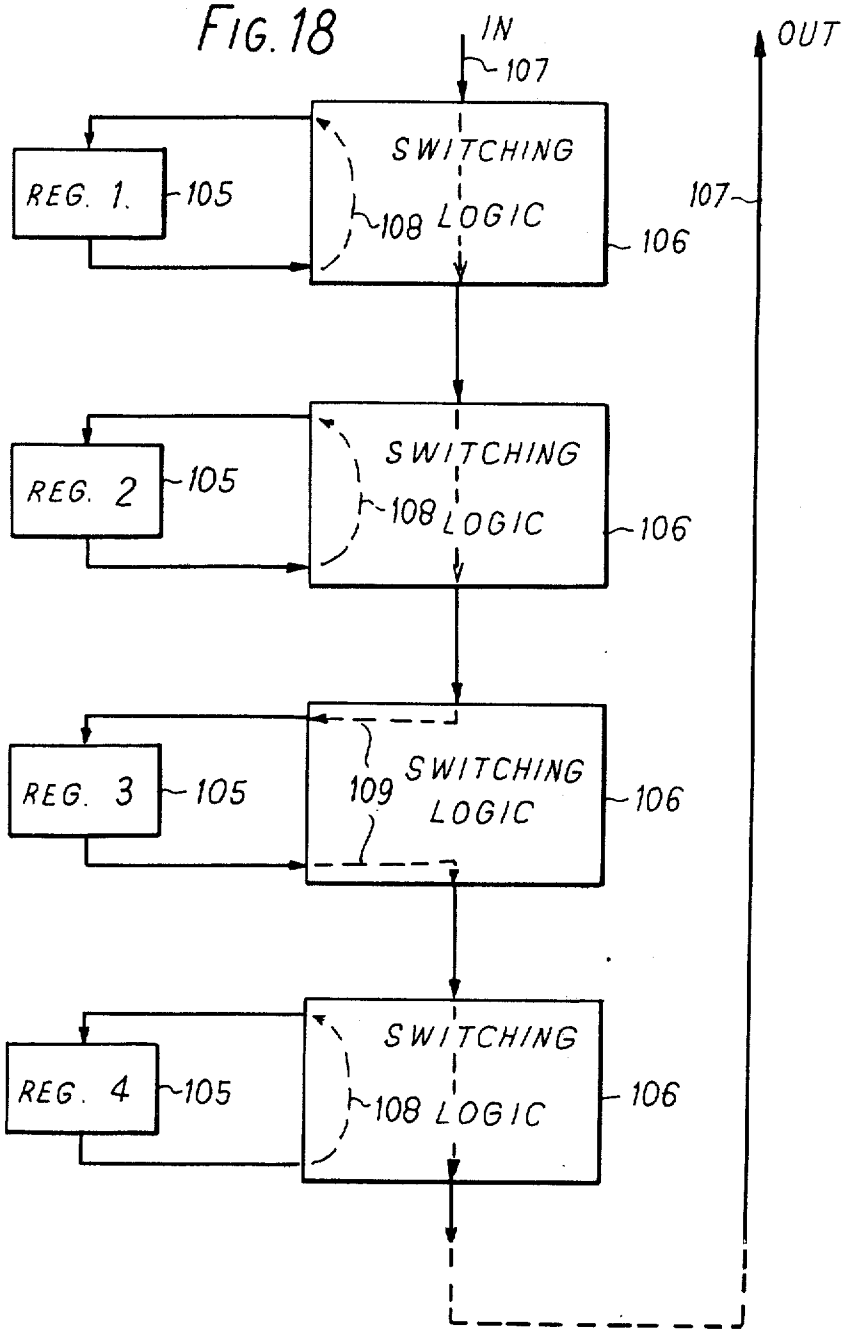

FIG. 18 illustrates a third embodiment of the invention.

Figures 1, 2, 3, 4, 5:
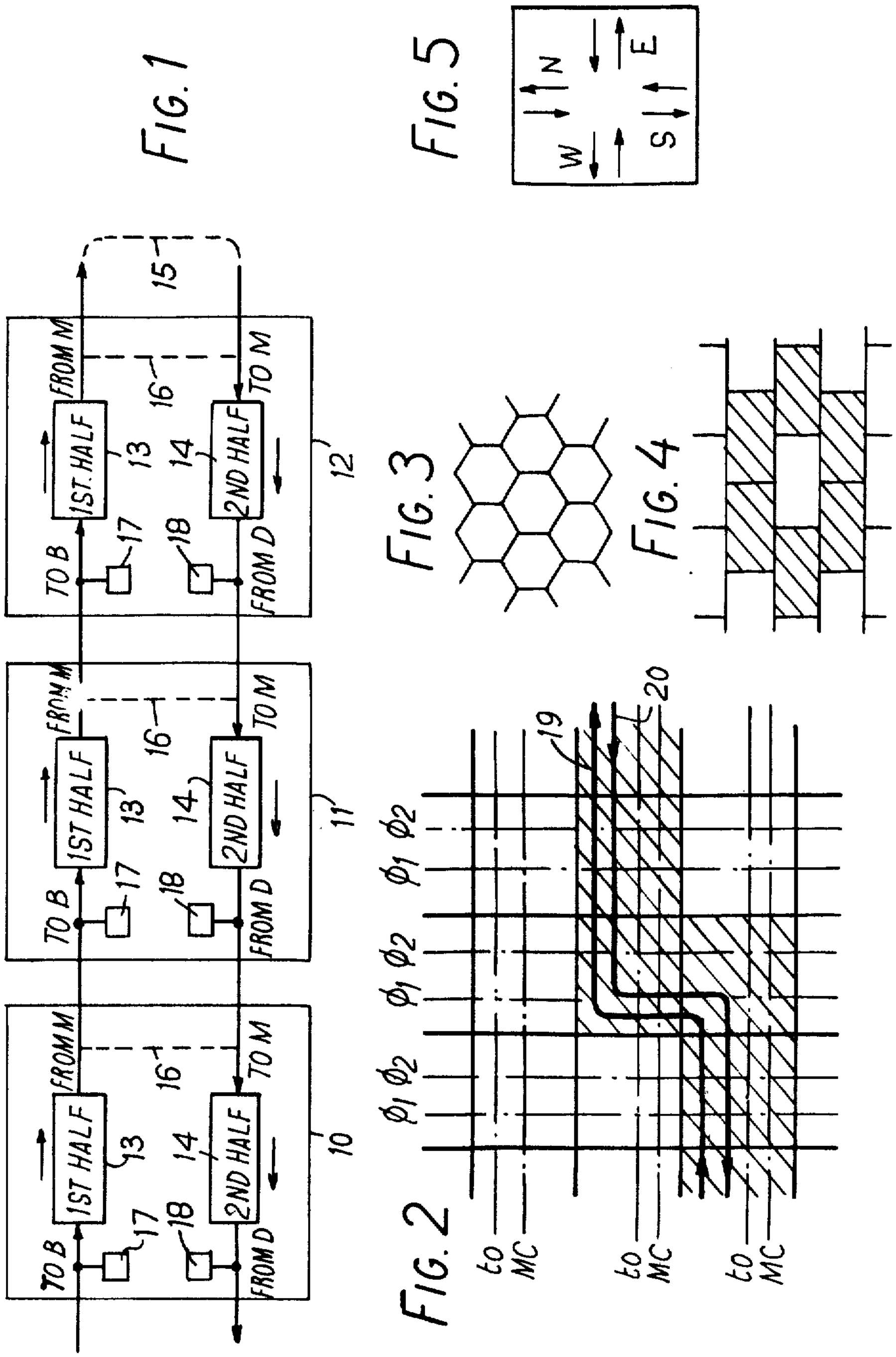
FIG. 1 is a block diagram of a chain of interconnected chips.
FIG. 2 is a schematic diagram of a rectangular array of chips with a data path formed through several chips.
FIGS. 3 and 4 show alternative chip arrays.
FIG. 5 shows the directions pertaining to a single chip.

FIG. 1 shows the electrical nature (bot not the geometrical relationships) of three chips 10, 11, 12, when they have been connected in a chain. Each chip has a shift register split into first and second halves 13 and 14. A single long shift register is formed by connecting both the first halves and the second halves in cascade, data flowing through the first halves 13 and, at the end of the chain, as indicated at 15, reversing the flow back through the second halves 14. Each chip has a switched connection 16 for connecting the first half 13 of the register of the second half. Each chip also has an input pad 17 and an output pad 18 and connections are made to the pads 17 and 18 of the chip selected to be first in the chain. If this chip should be faulty, connections have to be made to the pads of a different chip.

Each chip has four connections which are labelled as follows:

TO B = input to beginning of shift register.

FROM M = output from middle of shift register.

TO M = input to middle of shift register.

FROM D = output from end of shift register.

It will be noted that a connection which is TO B, for example, so far as one chip is concerned is FROM M relative to the preceding chip. For the avoidance of confusion, the given designations will always be employed as they apply to the chip under discussion.

Although not illustrated, it is obviously also necessary to provide a power supply grid with lines at say 0v and 5v, although these values will depend on the technology used to form the wafer. All the grids are laid down so as to connect to the correct regions of all chips and connections to the external circuitry are bonded to the grids at points round the periphery of the wafer.

The power supply grid can incorporate fusible links such that, if a chip develops a short circuit fault, the power supply is automatically removed from that chip, which simply becomes a bad chip which will be avoided when a chain of chips is built up.

A typical geometrical layout is illustrated in FIG. 2 where the squares represent chips in a rectangular array and the shaded chips are those which are assumed to have been interconnected for forward and return flow of data along paths 19 and 20. The path 19 includes a shift register first half 13 within each shaded chip; likewise the path 20 includes a shift register second half 14 within each shaded chip.

Conductor grids are provided, as indicated by broken lines, for conveying four signals to all chips, namely:

MC = master clear $t_0$ = word timing $\phi_1$ = phase 1 clock $\phi_2$ = phase 2 clock.

$\phi_1$ and $\phi_2$ are conventional two phase clock signals in antiphase with each other.

Although the clock lines are shown extending only in the column direction and the timing and clear lines only in the row direction, in order not to confuse the drawing, it is preferable for all such lines to be constituted by an interconnected grid of lines extending in both the row and the column directions. This will ensure that a connection remains to all good chips notwithstanding a fault at a bad chip. Similarly, grids of power lines are provided to the chips and these lines and also the lines mentioned above can incorporate fusible links which enable a bad chip at which there is a short-circuit fault, to be isolated, thus removing the short-circuit from the remaining, operative part of the grids.

FIG. 2 appears to represent the most practicable chip layout. Each chip has four neighbours; neighbours must be edge neighbours, sharing a common edge, to enable the necessary interconnections to be made. However, the chips can be arranged differently and FIG. 3 shows hexagonal chips in a honeycomb layout which surrounds each chip with six neighbours. FIG. 4 shows how six neighbours can be achieved by staggering the rows of a rectangular array. The six neighbours of the central chip are shaded. Although the arrangements of FIGS. 3 and 4 will increase the flexibility in forming chains they will also require increased complexity of control logic to select one of the six neighbours to form the next in the chain. Further attention will be confined to the layout of FIG. 2.

As noted, FIG. 1, shows the nature of the chips which have been connected in a chain. Thus TO B, FROM M, TO M and FROM D,have all been shown as single connections. Since a chip has four neighbours, each such connection is actually a selected one of four possible connections extending N to the chip above, E to the chip to the right, S to the chip below and W to the chip to the left. The directions N, E, S, W are denoted in this way in FIG. 5 and it is to be noted that the directions refer to the direction from the chip under discussion to the neighbour in question, regardless of the direction of information flow.

A complete characterisation of an input or output connection is obtained by adding N, E, S or W to the designations TO B, FROM M, etc. All 16 input and output connections are labelled in this way in FIG. 6 which shows the first and second halves 13 and 14 of the shift register and the gates which open up the various input and output connections.

For simplicity, the total length of the shift register is assumed to be 128 bits which are stored in bit cells B0 to B127. Each bit cell consists in known manner of two "half-bit cells" clocked by $\phi_1$ and $\phi_2$ respectively. When it is necessary to distinguish the half-bit cells they will be labelled with subscripts *a* and *b* respectively. In practice (and without making any difference in substance to the description which follows) a substantially larger number of bits will be employed, e.g. of the order of 1,000.

In building up a chain of good chips, each newly added chip must firstly be connected by To B and FROM D connections to the preceding chip, which has a known direction N, E, S or W relative to the new chip. Such connections are effected by signals LOOK N, LOOK E, LOOK S and LOOK W, respectively whose derivation will be explained with reference to FIG. 7, and which control four input gates 21 and four output gates 22. The input pad 17 is treated as if its input emanated from a chip to the north and this input is therefore combined with TO B.N by an OR gate 23. The output from the register is also connected to the output pad 18.

So long as a chip is the last in the chain, the first and second halves 13 and 14 of the register have to be interconnected via a connection 16, corresponding to the like-numbered connection in FIG. 1, under the control of a set-reset flip-flop 24 which furnishes a signal OPEN, signifying "open up to the next chip", when the flip-flop is set. Initially the flip-flops of all chips are reset, or cleared, by the master clear pulse MC and the signal OPEN is false. A gate 25 is then enabled to complete the connection 16.

When the flip-flop 24 is set, in a manner to be described, OPEN appears, the gate 25 closes and a gate 26 opens to connect the output of the first half 13 of the register to whichever of four middle output gates 27 is enabled by a signal OPEN N, OPEN E, OPEN S or OPEN W. These latter signals also control four middle input gates 28 for connecting to M.N, TO M.E, TO M.S or TO M.W to the input of the second half 14 of the register.

Figure 6:
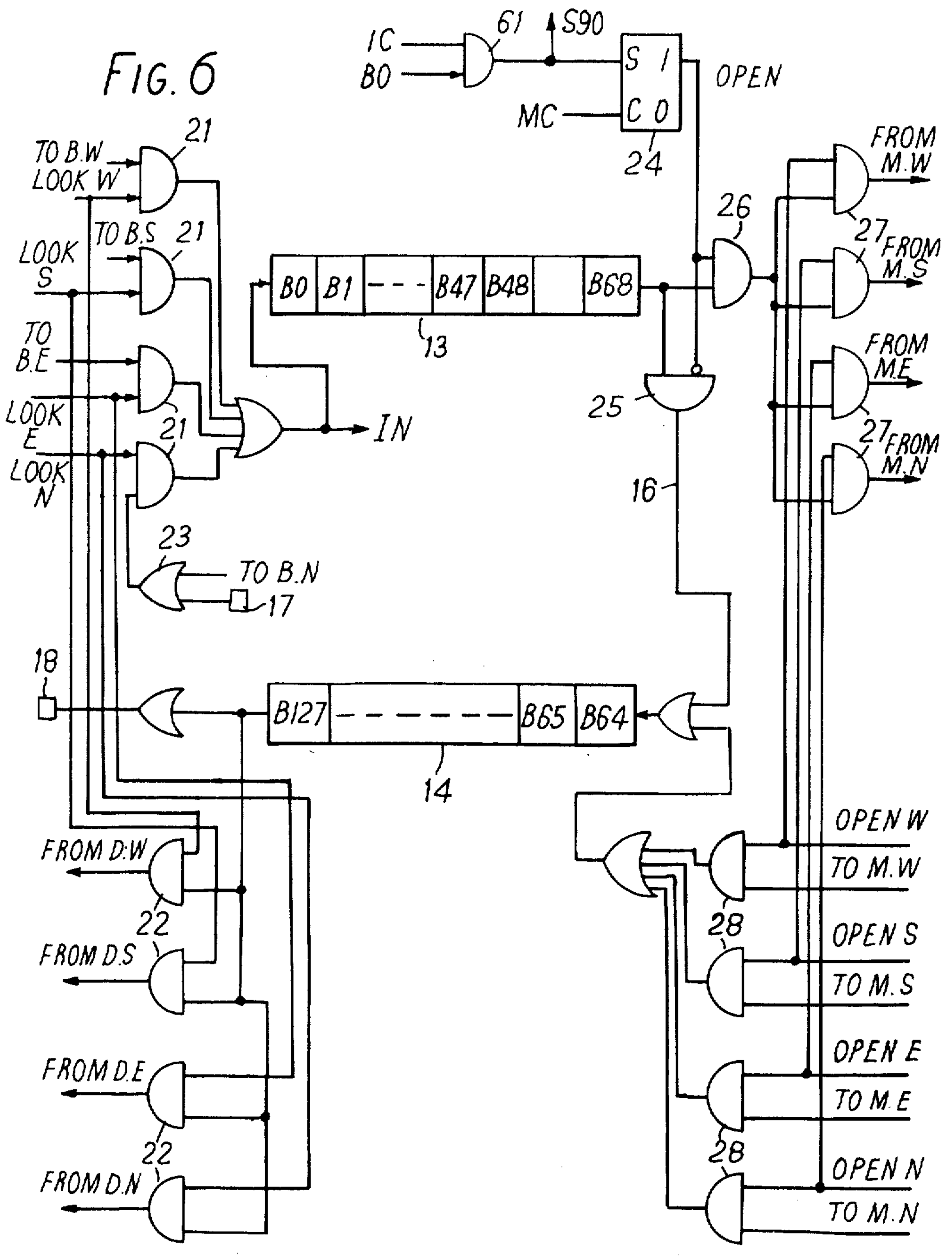
FIG. 6 shows the shift register and associated input and output gates of a single chip.

The 16 TO and FROM connections shown in FIG. 6 are geometrically disposed along the relevant N, E, S and W edges of the chip and are continuous with the matching connections of the four adjacent chips. For example, TO B.N is continuous with FROM M.S of the chip to the north (cf. FIG. 1), and so on. The formation of continuous connections is achieved by appropriate overlapping of the masks used in the manufacture of the various chip areas on the wafer.

Figure 7:
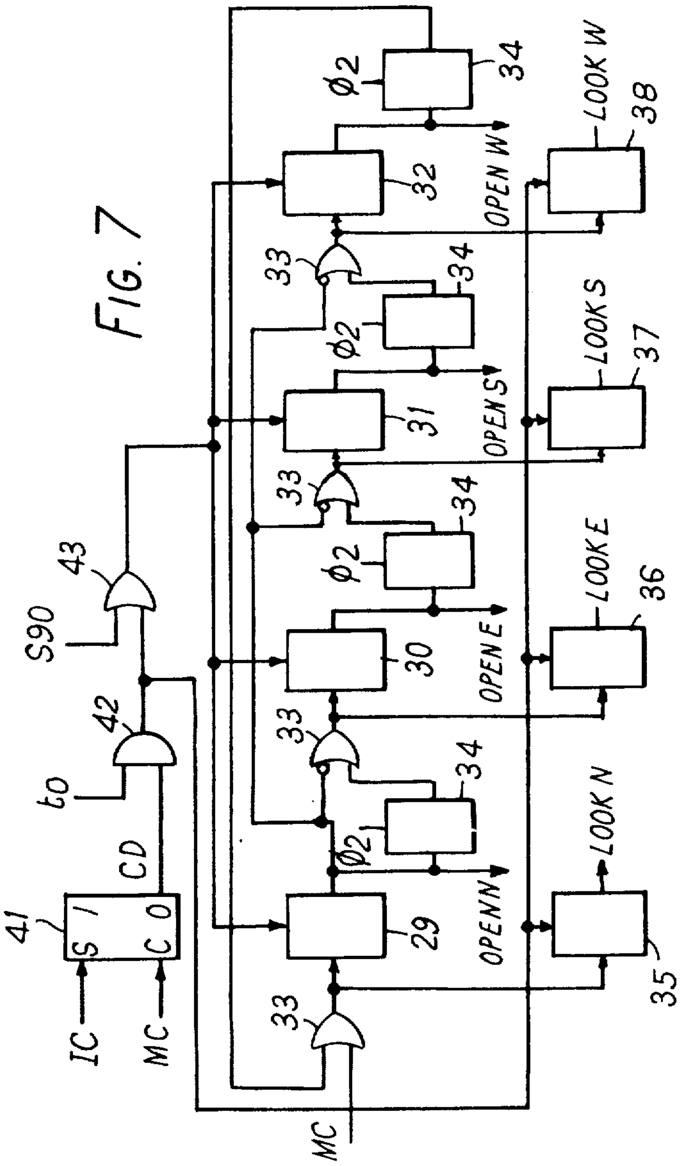
FIG. 7 shows the logical circuit of the chip for selecting the input and output gates.

Turning now to FIG. 7, set-reset flip-flops are designated by the labels S (set) and C (clear) on their inputs. Un-labelled rectangles are all clocked (or D-type) flip-flops which only change to the state of their input on receipt of a strobe pulse on the vertical input to the rectangle.

The OPEN N, etc. signals are provided by a chain of four flip-flops 29, 30, 31 and 32 connected in a loop with OR gates 33 and interstage flip-flops 34 clocked by $\phi_2$. The states of the flip-flops 29 to 32 are copied by four flip-flops 35 to 38 which provide the LOOK N, etc. signals.

Initially, the master clear pulse MC is applied to all chips and forces a 1 into flip-flops 29 and 35 and a 0 into the flip-flops 30, 31, 32, 36, 37 and 38, by virtue of the gates 33. All chips therefore start looking north and ready to open to the next chip to the north. MC also resets a flip-flop 41 which provides a chip-disconnected signal CD indicating that the chip has not yet been connected to a preceding chip and enables a gate 42 to pass to the strobe inputs of the flip-flops. The pulse $t_0$ recurs once every word time, also referred to as the chip time, which is 64 bit times, i.e. the time taken for a bit to traverse the first half of a chip.

So long as CD is present and the gate 42 is enabled, $t_0$ strobes the flip-flops 29 to 32 and 35 to 38, thereby to step through the sequence LOOK/OPEN N, LOOK/OPEN E, LOOK/OPEN S, LOOK/OPEN W; this is referred to as the free running search and each phase thereof lasts for one word time. When flip-flop 41 is set by an implement command signal IC, CD disappears and the search ceases.

The state of flip-flops 35 to 38 is frozen at the selected look-direction; so is the state of flip-flops 29 to 32, although these flip-flops can be strobed further by a pulse S90, described below, via a gate 43.

During control operations, the external control logic described below, sends control words whose first and second bits, counting from the least significant, front end of the words are respectively 1 and 0. Data words are distinguished by a different front end code, for which reason there is a loss of data storing capability.

Figure 8:
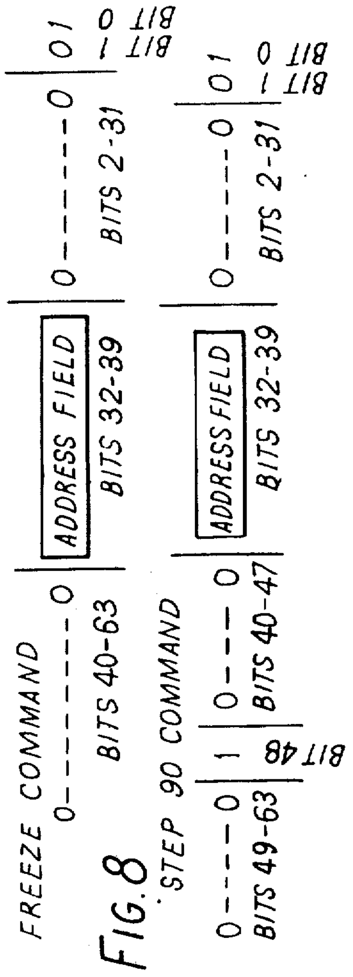
FIG. 8 shows the format of the two control words.

Control words have two different formats, namely a freeze command and a step 90 (i.e. 90°) command as shown in FIG. 8. Note that the bits of a word are denoted BIT0, BIT 1, etc. in contrast to the register stages or cells, which are denoted B0, B1, etc. The external control logic knows, when sending the freeze command to a chip that is the *n*'th chip in the chain and knows the look-direction required as this is opposite to the open up direction adopted by the previously connected chip. The addressing of the required look-direction is achieved simply by launching the freeze command at such a time that it will reach the addressed chip when this chip is looking in the required direction. If *n*/MOD 4/ is written as *n'*, the launching phases can readily be seen to be as listed in Table I.

Table I

| n' | REQUIRED DIRECTION | N | E | S | W |
|---|---|---|---|---|---|
| 1 | LAUNCHING | N | E | S | W |
| 2 | | W | N | E | S |
| 3 | PHASE | S | W | N | E |
| 0 | | E | S | W | N |

The addressing of the *n*'th chip is effected, on the other hand, by inserting as an address in the address field (FIG. 8) the number *n*-1 in binary code. Every chip traversed subtracts 1 from the address number and, when the addressed chip is reached, a borrow propagates and denotes that the chip is the addressed chip.

The way in which these operations are performed will be explained with reference to FIG. 9. By definition, the search phase preceding the addressed phase, must have all zeroes in its word. Such a word leaves a flip-flop 44 set at the commencement of the addressed phase, whereby a flip-flop 45 is also set to enable a gate 46. If there is any 1 bit in the word it resets the flip-flop 44, whose clear input is connected to IN, i.e. the input to the shift register 13, 14 (FIG. 6). $t_0$ is synchronous with $\phi_1$ of B1T O and if, in the addressed phase B1T O = 1 appears with gate 46 enabled, a flip-flop 47 is set. If then B1T 1 = 0, a gate 48 is enabled and a command flip-flop 49 is set to provide a command signal CC.

The single bit, B1T O = 1, which has entered the register is used as a timing bit, and to avoid confusion of the timing operations by other 1 bits, timing operations are all controlled from B31 plus the second half of the top register half 13 and all of bits 2 to 31 are made zero in a control word.

When the single bit reaches B31 it passes through gate 50, enabled by CC, and sets a subtract flip-flop 51 which enables a gate 52 which, together with gates 53, 54 and 55 and buffer flip-flops (half-bit cells) 56 and 57 forms a complementing subtract 1, circuit operative between B0*a* and B0*b* of the shift register. The output of a gate 58 is a borrow bit. The number in the address field (FIG. 8) therefore has 1 subtracted from it and eventually this subtraction leads to a continuously propagating borrow bit. The absence of this bit is detected when the preliminary B1T O = 1 reaches B47 by means of a gate 59 which, so long as the chip is not the addressed chip, resets the command flip-flop 49 and the subtract flip-flop 51. The signal CC disappears and no further action takes place.

When the chip is the addressed chip, the presence of the propagating borrow bit inhibits the gate 59 and the flip-flops 49 and 51 are not reset; they are reset by the next $t_o$ pulse. CC now remains to enable a gate 60 which passes the B1T O = 1, when it reaches B48, to constitute an implement command signal IC. This signal sets the flip-flop 41 (FIG. 7) and thereby removes CD. $t_o$ can no longer strobe the flip-flops of FIG. 7 and the circuitry freezes with the required look direction flip-flop 35, 36, 37 or 38 holding an enabling bit for the gates 21 and 22.

The chip in question now forms the last chip in the chain and can be tested to see if it is a good chip. To this end a suitable sequence of data words is sent into the chain, stored for a time such as 1 second, and then clocked out to see if the data has been correctly stored. During the test supply grid voltages and clock pulse timings are preferably varied within suitable limits to ensure that the chip is capable of working properly within acceptable tolerances. If the test is satisfactorily completed, provision is made to open up to the next chip and, with a view to promoting the formation of spirals, this is always done by stepping 90° in the clockwise direction, e.g. a chip which is looking N to the preceding chip will attempt to open up E to the succeeding chip. If this attempt fails, it will attempt to open up S and then W.

These operations are caused by the step 90 command which (FIG. 8) differs from a freeze command only in that it has a 1 at B1T 48. If this 1 is present it is in B0 at the same time as IC is generated and a gate 61 (FIG. 6) thereupon opens to generate S90 which sets the flip-flop 24 and also, via the gate 43 (FIG. 7) strobes the flip-flops 29 to 32 to effect the step 90 operation.

Figure 10:
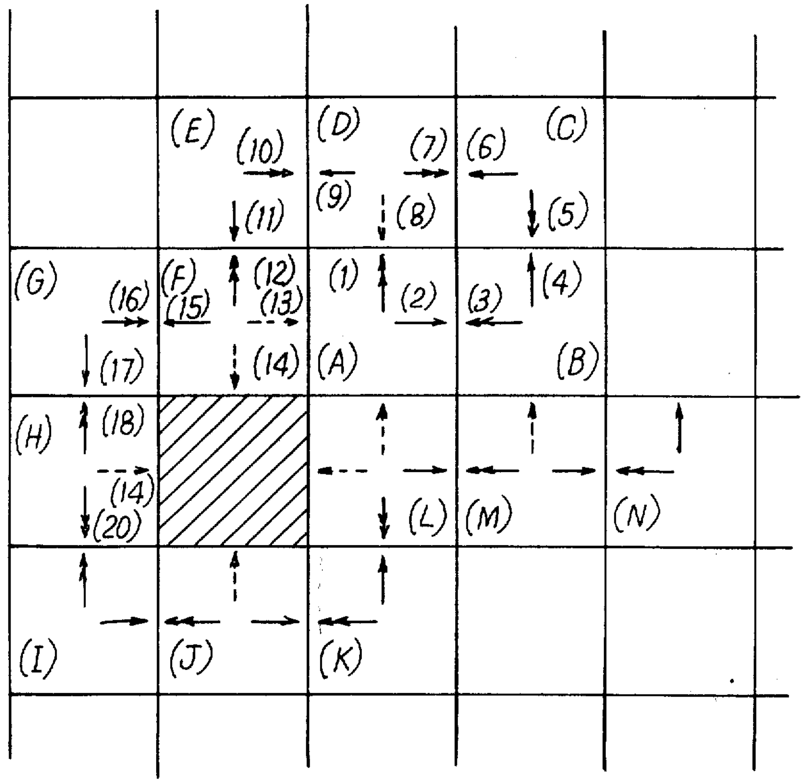
FIG. 10 illustrates the manner in which a spiral chain of chips may be built up.

A typical sequence of operations in building up a chain will now be described with reference to FIG. 10. Double headed arrows are used to denote look directions, single headed arrows to denote open up directions and broken arrows to denote open up directions which are tried but found to be unusable. The shaded chip is assumed to be defective. The letters in brackets denote the sequence of chips built up into a chain (A), (B), (C), etc. and the numbers in brackets refer to the operations listed below.

1. Chip (A) look N (freeze command) to connect to pads 17 and 18. Test chip (A): good.
2. Apply step 90 command to open up E.
3. Chip (B) look W (freeze command with address code 1) to connect to chip (A). Test chip (B): good.
4. Apply step 90 command, address code 1, to open up chip (B) to N.
5. Chip (C) look S (freeze command with address code 2) to connect to chip (B). Test chip (C): good.
6. Apply step 90 command, address code 2, to open up chip (C) to W.
7. Chip (D) look E to connect to chip (C). Test chip (D): good.
8. Step 90 to open up chip (D) to S. The operations will now attempt to treat chip (A) as chip (E) but the test will obviously lead to a spurious result and therefore:
9. Apply another step 90 command to chip (D) to open Chip (D) to W.
10. Chip (E) look E. Test chip (E): good.
11. Step 90 to open up chip (E) to S.
12. Chip (F) look N. Test chip (F): good.
13. Step 90 to open up chip (F) to E. The operations will now attempt to treat chip (A) as chip (G) but the freeze command will not cause chip (A) to look W as it is already frozen looking N. Therefore:
14. Step 90 to open up chip (F) to S. The faulty chip will now be told to look N and will be tested. The test result will be bad, therefore:
15. Step 90 to open up chip (F) to W.
16. Chip (G) look E. Test chip (G): good.
17. Step 90 to open up chip (G) to S.
18. Chip (H) look N. Test chip (H): good.
19. Step 90 to open up chip (H) to E. The faulty chip will be told to look W and will be tested, with a bad result. Therefore:
20. Step 90 to open up chip (M) to S.

The further operations involving chips (I), (J), etc. will not be described. They will be obvious from the foregoing and from the arrows in FIG. 10.

When, for example, addressing chip (H) i.e. $n = 8$, both the freeze command and each step 90 command starts out with the number 00000111 in the address field. Chip (A) reduces this to 00000110, chip (B) to 00000101, and so on until chip (G) reduces it to 00000000. The propagating borrow therefore arises in chip (H) to signify, by preventing rest of the command flip-flop 49, that (H) is the addressed chip.

Once a chain of suitable length has been built up, a long shift register exists, bypassing all defective chips and this register may be used as a long delay line store, e.g in place of a magnetic disc store. If at any stage a fault develops, it is not necessary to perform expensive test and repair procedures. The chain of chips is merely reformed anew, after application of MC.

Figure 11:
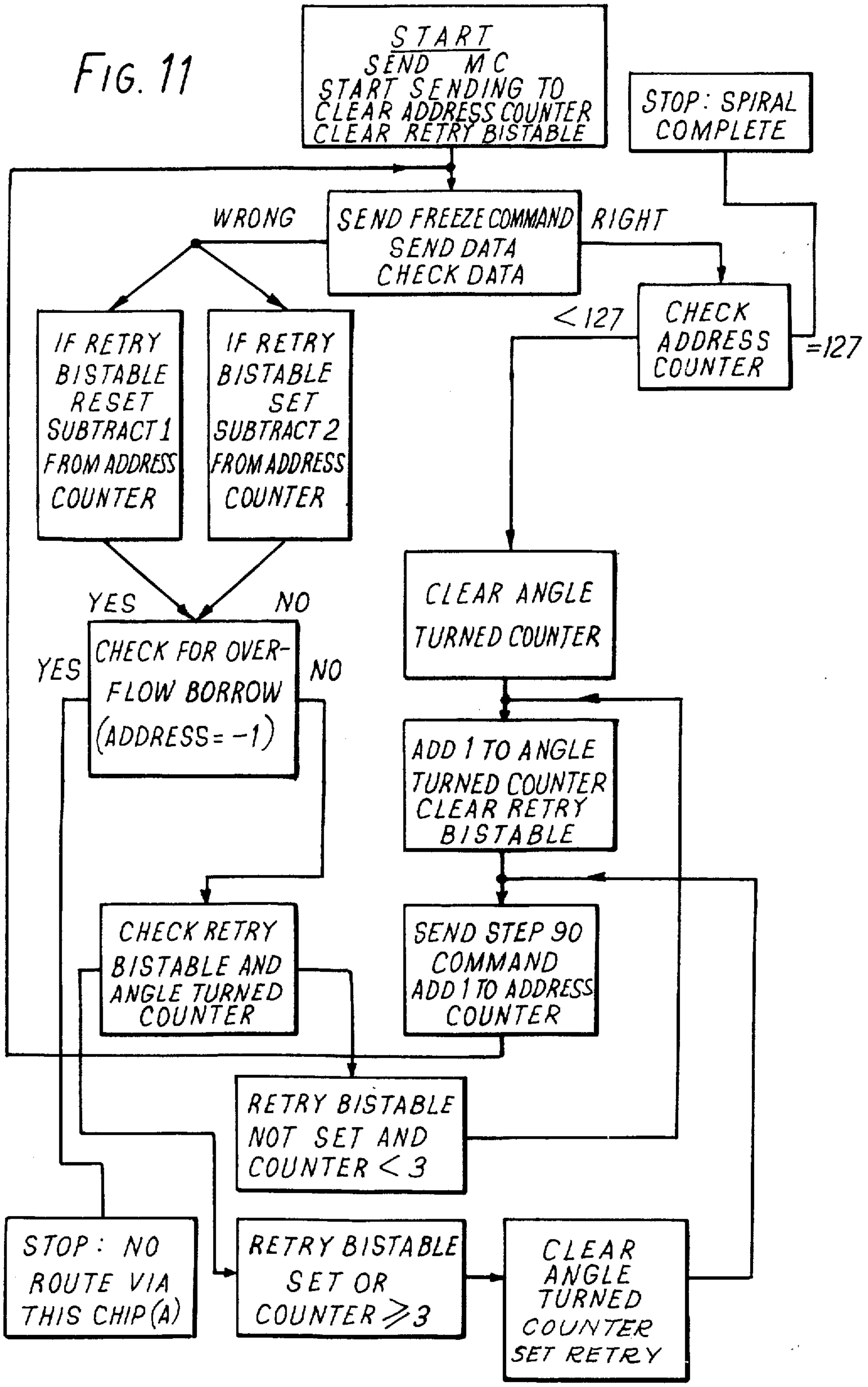
FIG. 11 is a flow chart defining the nature of the external control logic which controls the building up of a chain of good chips.

The actual circuitry of the external control circuit which controls the chain building will not be described. This circuit merely has to perform a sequence of logically determined operations and it will suffice to provide the flow chart for these operations; this is shown in FIG. 11 and includes the operations necessary to take account of the situation explained with reference to Table I.

The RETRY BISTABLE allows retracing by one or more chips, to get the spiral out of dead ends. During a retrace, only one further downstream direction may be attempted by each chip in the (now retracting) spiral; otherwise it would be possible to hang up, oscillating between two dead ends.

The fact that, to connect two chips, the first has to be told to open up in one direction and the second has to be told to freeze looking in the opposite direction provides a reasonable degree of security against branching of the chain which would, at best, lead to rapid wastage of chips.

As so far described, the circuit constitutes a large shift register store, with a necessarily long access time, comparable to that of a magnetic disc store. However, the relative cheapness of the IC store and the well known mechanical problems associated with disc stores, make the IC store an advantageous alternative to the disc store. If each chip has a capacity of 1000 bits and there are 400 chips on a wafer, with up to 50 percent of the chips usable in forming a chain, the maximum capacity is $2 \times 10^5$ bits. The bit rate may be 10 MHz, i.e. a bit period of 100 nS, which gives a total memory cycle of 20 mS.

The speed may be increased by forming a plurality of parallel data paths, say 10, on each chip, each of capacity only 100 bits. In a chain of 200 chips there are then 10 parallel shift registers of capacity $2 \times 10^4$ bits and the memory cycle is only 2 mS. However, this leads to practical problems in that each chip has to have 10 input pads, and 10 output pads, which leads to a significant loss of chip area, and instead of four connections between each pair of adjacent chips, there have to be 40. It may be difficult to lay down all these connections, bearing in mind that the conductors have to be wide enough to tolerate some degree of misregistration between the masks used in forming adjacent chips.

For these reasons, it is preferred to increase the speed of access by doing away with the $t_0$ control line and providing a fast control line forming a data path to all chips. An embodiment of the invention having this facility will now be described.

This embodiment constitutes a medium speed memory comparable with a core memory. Basically the same long shift register structure now has associated therewith the fast line which has rapid access to every chip and preferably has rapid access to each of a plurality of word cells on a chip. The switching logic is arranged to establish the fast line interchip connections in parallel with the shift register inter-chip connections. The long shift register will be called the slow line.

Figure 12:
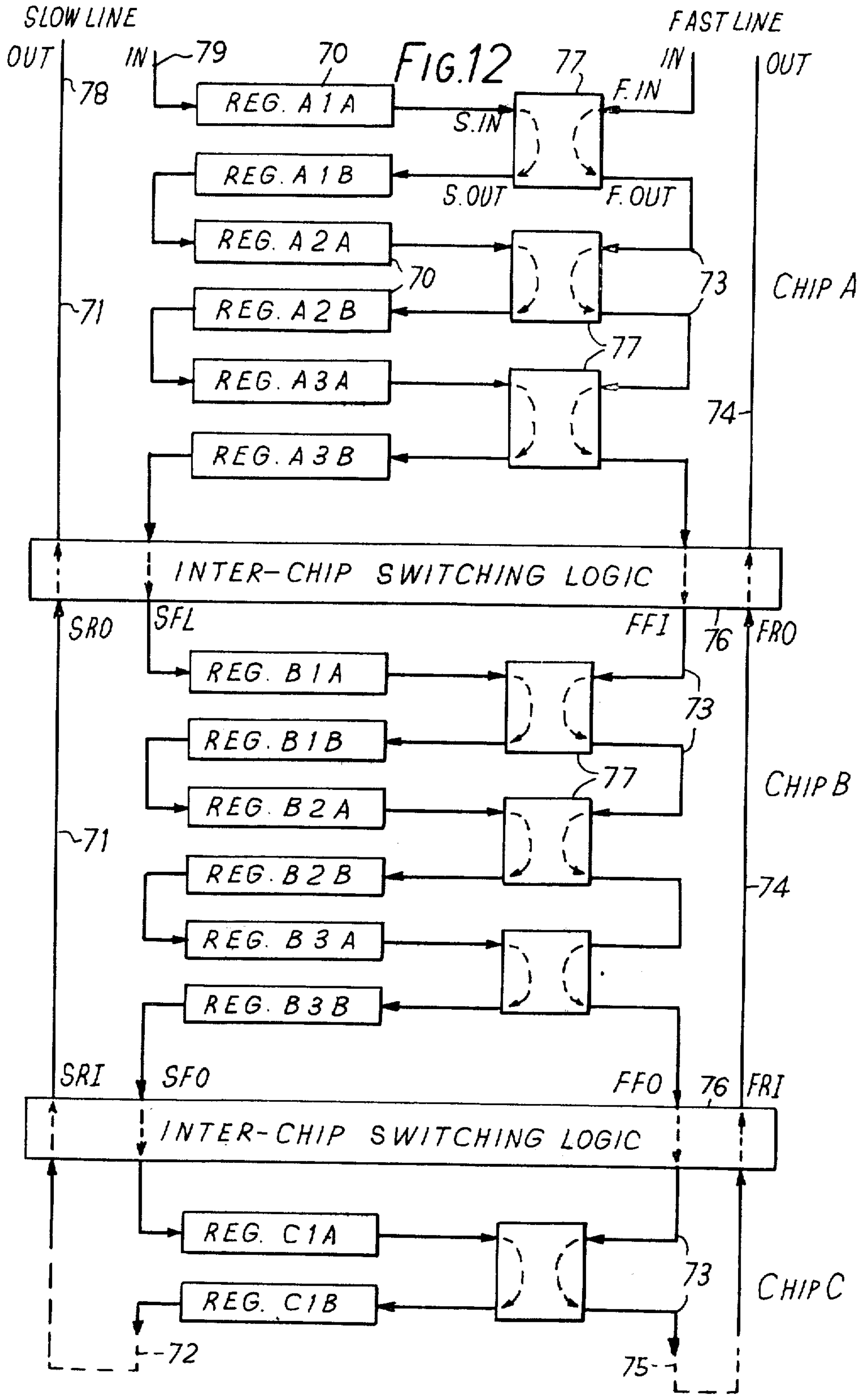
FIG. 12 illustrates a chain of chips having a fast line giving rapid access to word cells.

FIG. 12 shows the basic electrical layout of a memory after the inter-chip connections have been established essentially in the manner already described. For simplicity only two chips A and B and part of chip C are shown; in practice the completed chain will typically contain 128 chips. Furthermore, each chip is shown with a capacity for three words only; in practice each chip may handle 25 words.

The slow line is formed by shift register sections 70, all (in contrast to FIG. 1) connected in the forward part of the data flow path, and by direct return connections 71. The broken line connection 72 represents the remainder of the slow line through chip C and the rest of the 128 chips. The register sections 70 are arranged in pairs and each pair constitutes one word cell. The sections 70 are labelled A1A etc. with the understanding that the first letter is the chip letter, the digit is the word cell number within the chip and the last letter is A for the first section of a word cell and is B for the second section of a word cell.

The fast line is formed by forward connections 73 and return connections 74 with the dotted connection 75 representing the part of the fast line through the remainder of chip C and the rest of the 128 chips.

Each chip thus has eight input and output connections which are labelled for chip B as follows:

SFI = Slow line, forward, in
SFO = Slow line, forward, out
SRI = Slow line, return, in
SRO = Slow line, return, out
FFI = Fast line, forward, in
FFO = Fast line, forward, out
FRI = Fast line, return, in
FRO = Fast line, return, out These connections are switched to the matching connections of the preceding and succeeding chips by inter-chip switching logic 76 which contains sets of gates corresponding to the sets 21, 27, 28 and 22 of FIG. 6 for the slow line and duplicate sets for the fast line. These sets of gates and the control logic therefor will not be described in detail; nor will the procedure of setting up the chain of chips. These circuits and operations are not essentially different from those of the previously described embodiment.

It is to be noted, however, that the previously described procedure relied upon the use of the $t_0$ line to step the control logic of all unconnected chips through the cyclic sequence LOOK N, LOOK E, etc. The second embodiment, as so far described, has no $t_0$ line although this line and the reset line may be provided to enable setting up of the chain to takes place as previously described. However, it is desirable to minimize the number of grids extending to all the chips and alternative procedures can be adopted. One alternative is to avoid a MASTER CLEAR grid by arranging that a chip will master clear if it does not receive a distinctive $\overline{\text{CLEAR}}$ code periodically down the fast line. It can also synchronize its timing by recognising a distinctive timing pattern down the fast line. This requires control signals to be sent down the fast line during the setting-up procedure and these control signals must be distinguished from the commands which are described below. Each chip must then include logic responsive to such fast line control signals. A second alternative is that direction will not be specified, as in the first embodiment, by the timing of the control signals within the look direction sequence, but by direction codes included within the control signals. Each chip must then have logic responsive to such codes to enable the required gates.

Inbetween each pair of register sections 70 a logical control and switching network 77 provides for communication between the fast and slow lines. In the normal working state of the memory, when the networks 77 complete the connections of the slow and fast lines as shown by the broken lines within the blocks 77, the stored words follow each other down the slow line. As a word reaches the end 78 of the flow line it is reintroduced at the beginning 79. Each stored word has two fields, first a tag field and then a data field, so that the following sequence will pass a point in the slow line:

- - - /Tag 0/Data 0/Tag 1/Data 1/Tag 2/Data 2/ - - - /Tag 127/Data 127/Tag 0/Data 0/ - - -

A word consists of 48 bits; the 12 least significant are tag bits which are followed by 32 data bits and finally by four dummy bits. A lot of storage capacity is thus "wasted" but this is inevitable in any memory using content addressing and is not a serious disadvantage in view of the increased speed and the cheapness of IC circuitry.

Commands (which are not to be confused with the control signals sent down the fast or slow line when setting up the chain of chips) are sent down the fast line and will typically be READ and WRITE commands or READ and EXCHANGE (= READ/WRITE) commands. A command has the following format, reading from the least significant end:

Two command bits (identifying the nature of the command), 12 mask bits, 32 data bits, two dummy bits. In a READ command the data field is empty, ready to receive the data which is read out.

The 12 mask bits are timed to reach the fast line inputs F. IN of the networks 77 at the same time as the 12 tag bits in each word cell of the slow line reach the slow line inputs S. IN. The mask bits will match the tag bits at one network 77 and this network responds to execute the command. The connections established by the networks 77 can be represented as in FIG. 13, labelling the network inputs and outputs as in FIG. 12.

It can be seen without further explanation that the illustrated connections establish the normal condition (FIG. 13(*a*) — corresponding to the broken line connections in blocks 77 in FIG. 12), the READ condition (*b*), the WRITE condition (*c*), and the EXCHANGE condition (*d*).

One way in which these interconnections may be established is shown in FIG. 14 in which the inputs S. IN and F. IN are normally connected to outputs S. OUT and F. OUT respectively through gates 81 and 82 respectively and OR gates 83. The presence of a READ command and of a READ TIMING signal (which demarcates the data field) enables a gate 84 whose output disables the gate 82 and enables a gate 85 to establish the connections of FIG. 13(*b*). The presence of a WRITE command and of a WRITE TIMING SIGNAL (which demarcates the data field) enables a gate 86 whose output disables the gate 81 and enables a gate 87 to establish the connections of FIG. 13 (*c*). The EXCHANGE command merely requires simultaneous application of the READ and WRITE signals, with their timing signals. The gates 84 and 86 can only be enabled in the presence of a MATCH signal which is a signal indicating that the word cell in question has been addressed by the MASK signal.

The circuit of FIG. 14 thus allows the 32 bits of data flowing down the fast line to be serially swapped with the 32 bits of data (with the correct tag) flowing down the slow line, for implementation of the EXCHANGE command. Similarly, during a READ command, a READ data word is fed on to the fast line into the empty data field at the end of the command. For circuit design and speed reasons, a READ data word is fed on to the fast line one or two bit times late compared to the position occupied by a WRITE data word on the fast line. It is for this reason that the commands end with dummy bits.

In addition to the switching logic of FIG. 14, the networks 77 contain the circuits necessary to compare addresses, recognize commands, and time the switching operations. These circuits mut to some extent, as in the case of the switching logic, be individual to the word cells but can in part be common to all the word cells of a chip. In design it is important to use as much common circuitry as possible since circuits individual to the word cells have to be repeated 25 times per chip.

It should be noted that it is not possible to establish a common timing pattern right across the wafer. The chip-to-chip delay along the fast line cannot be ignored and may, in practice, be equivalent to half a bit. This is compensated for by making the total delay along the slow line of one chip equal not to 25 × 48 bit intervals but equal to (25 × 48) + ½ bit intervals. For this reason the roles of $\phi_1$ and $\phi_2$ have to be interchanged from chip to chip. The way in which this is done is described below. For the time being it will be sufficient to use $\phi_1$ and $\phi_2$ to denote the timing signals as applied to the grid of timing connections across the wafer and to use $\phi'_1$ and $\phi'_2$ to denote the timing signals actually treated as $\phi_1$ and $\phi_2$ by any single chip. Alternate chips along the chain have $\phi'_1 = \phi_1$ and $\phi'_2 = \phi_1$. The intervening chips have $\phi'_1 = \phi_2$ and $\phi'_2 = \phi_1$.

The common command circuits of a chip are illustrated in FIG. 15 and consist of decoding logic 90 which decodes the command bits and provides the READ and WRITE signals correspondingly. If an EXCHANGE command is employed the logic 90 responds thereto to provide the READ and WRITE signals simultaneously. Since it is no longer possible to use an external timing signal $t_0$ as in the first embodiment, because of the chip to chip delay along the fast line, the chip timing sequence is established by a timing counter and decoder 91 which counts bit intervals from the time that it is triggered by the decoding logic 90. The counter is synchronized by a sync command down the fast or slow line, which may be an all-zeros word followed by a 1. The counter 91 can be a feedback shift register of 6 bits capacity so interconnected with logical gates as to cycle through a chain code with 48 bits in the cycle. Such arrangements are well known per se. Particular states of the counter are decoded to generate the READ TIMING and WRITE TIMING signals, which are true for the appropriate 32-bit intervals, a START CHECK pulse which occurs just before the mask field and a FORCE MISMATCH FALSE SIGNAL which is true except during the mask field.

These latter signals are utilized by the comparison logic individual to a word cell, as shown in FIG. 16. This circuit is drawn in a manner suitable for MOS FET implementation although the invention is obviously not restricted to any particular type of IC technology. The comparison is effected by a word match bistable 92 which is set by the START CHECK pulse (a time pulse) and remains set if the mask matches the tag. The output of the bistable 92 is the MATCH signal applied to the gates 84 and 86 in FIG. 14. If any mismatch occurs during the mask/tag field the bistable is reset by a MISMATCH signal and the MATCH signal is therefore false by the time that the READ TIMING and WRITE TIMING signals are generated and neither gate 84 nor gate 86 can be enabled.

The MISTMATCH signal is generated by a circuit 93 operating, like the rest of FIG. 16, between supply rails at the TRUE and FALSE logical levels. Provided both MASK and TAG are ture or both $\overline{\text{MASK}}$ and $\overline{\text{TAG}}$ are true, FET's 94 or 95 hold point 96 false and the MIS- MATCH signal cannot be generated. If these conditions are not met, point 96 becomes true during $\phi'_1$, when FET 97 is gated on, and FET 98 gates out the true MISMATCH signal which clears the bistable 92 and so renders the MATCH signal false.

The true MISMATCH signal must not be allowed to occur outside the mask/tag field and, to this end, the FORCE MISMATCH FALSE signal turns on an FET 99 at all times other than during this field and holds the point 96 false.

$\overline{\text{MASK}}$ and $\overline{\text{TAG}}$ are generated from MASK and TAG by simple inverters 100 and 101.

As previously indicated the half-bit propagation delay from chip to chip along the fast line is dealt with by interchanging the roles of $\phi_1$ and $\phi_2$ from chip to chip. This is possible because if, FIG. 17, the array of chips is regarded as a chequer-board of black (shaded) and white chips, it can be seen that irrespective of the direction in which a chip opens up to the next chip, a black chip always open up to a white chip, and vice versa.

Provided that the chips are identical so that a left diagonal (top left to bottom right) connection represents a $\phi'_1$ line while a right diagonal connection represents a $\phi'_2$ line, it is apparent that, if the $\phi_1$ and $\phi_2$ connections zig-zag back and forth from chip to chip $\phi'_1 = \phi_1$ and $\phi'_2 = \phi_2$ in the black chips whereas $\phi'_1 = \phi_2$ and $\phi'_2 = \phi_1$ in the white chips, as required.

As in the case of FIG. 2, it is desirable to provide a grid of crossing lines. To avoid confusing the drawing, only a single row line for $\phi_1$ is shown.

This scheme of things is not necessarily employed. The $\phi_1$ and $\phi_2$ lines can extend to all chips in the same manner, as in FIG. 2, and the black chips can be formed differently from the white chips so that operations which are timed by $\phi_1$ in the black chips are timed by $\phi_2$ in the white chips, and vice versa.

Figure 9:
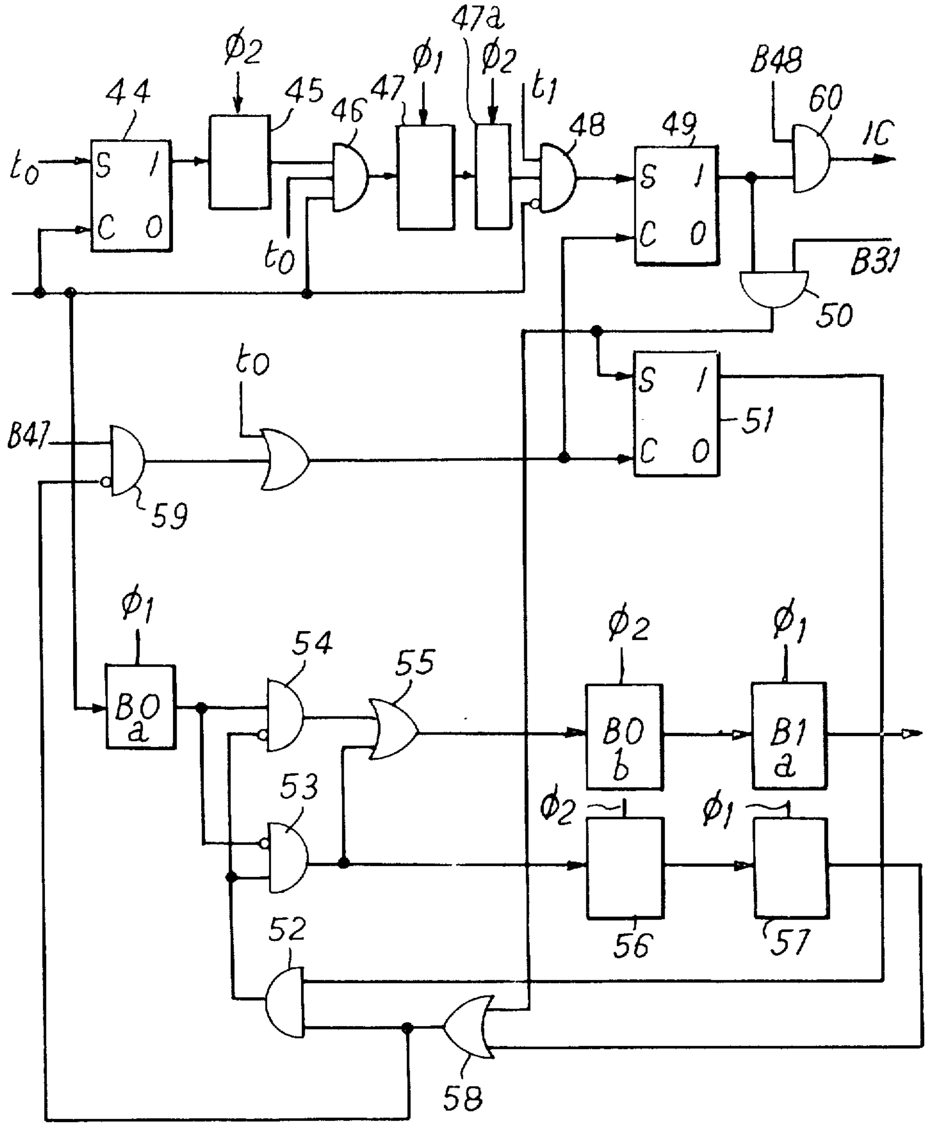
FIG. 9 shows the logical circuit of the chip for recognising a control signal and for decrementing the address thereof.

The essential function of the digital circuits in both embodiments described above is simply data storage although, as described in relation to FIG. 9, an elementary data processing facility is provided in order to be able to decrement control signal addresses. It is apparent that more extensive data processing facilities can be included in the chip logic, for performing required operations on the data signals, as well as on the control signals.

It is possible to achieve fast operation without the provision of a separate fast line by means of the arrangement illustrated in FIG. 18. Here each chip has its shift register 105 and its switching logic 106 which not only performs the function, described above, of interconnecting the chips, but also connects the chips in and out of the data line 107. In the normal state, the registers 105 of all chips merely recirculate their own contents, via connections 108 within the switching logic. When it is desired to read and/or write data from one chip, the switching logic thereof is addressed as explained above and switches its register into the data line. This is illustrated by the connections 109 for the third chip. Since only the register 105 of the addressed chip is connected in the data line 107, this line is a fast line, in contradistinction to the case of FIG. 1 and the slow line of FIG. 12.

As described in relation to FIG. 1, for example, the chain of shift registers extends through one wafer only. It is apparent that wafers can be connected in cascade to extend the lengths of the chains even further.

What is claimed is:

1. A digital integrated circuit comprising a plurality of undiced regions in a semi-conductor wafer, each region having at least one set of input connections and a plurality of sets of output connections and having formed thereon a digital circuit means for operating on digital information and for transferring digital information signals and control signals, said digital circuit including a logical switching circuit, said logical switching circuit including means for coupling a set of input connections to a selected one of the sets of output connections by way of said digital circuit, the sets of output connections being connected to sets of input connections of a plurality of neighbouring regions, and the logical switching circuit of each region including means responsive to certain of the control signals for changing the selected set of output connections.

2. A digital integrated circuit according to claim 1, wherein said digital circuit includes means for storing said digital information connected to said switching circuit.

3. A digital integrated circuit according to claim 1, wherein said digital circuit includes means for processing said digital information connected to said switching circuit.

4. A digital integrated circuit according to claim 1, wherein said digital circuit includes means for storing and processing said digital information connected to said switching circuit.

5. A digital integrated circuit according to claim 1, wherein the regions are identical regions.

6. A digital integrated circuit according to claim 1, comprising control means operative to address control signals to a succession of regions and to control the logical switching circuits of said regions to interconnect said regions in a chain.

7. A digital integrated circuit according to claim 6, wherein the control means is operative to address a control signal to the *n*'th region of the chain by including a numerical code in the control signal, each region of the chain including a circuit for effecting a predetermined modification of the numerical code such that the code assumes a region-identifying form at the *n*'th region, each region further including a circuit for recognizing the region-identifying code form and for commanding response to the control signal.

8. A digital integrated circuit according to claim 7, wherein the predetermined modification effected by each region of the chain is decrementing of the numerical value of the code.

9. A digital integrated circuit according to claim 8, wherein the numerical code furnished by the control means has the value $n - 1$ and the *n*'th region causes and responds to a continuously propagating borrow bit.

10. A digital integrated circuit according to claim 6, wherein the control means is constructed to follow a predetermined control sequence to link an additional region to the chain, said predetermined control sequence including addressing a control signal to the logical switching circuit of the preceding region of the chain, addressing a test data signal to the said additional region, receiving and checking the correctness of returned data signal, and then, if the returned signal is correct, proceeding to link a further region to the chain in like manner, but, if the returned signal is not correct, sending a further control signal to the logical switching circuit of the said preceding region of the chain to link this region to a different neighbouring, additional region and then proceeding to the addressing of the test data signal to this region and the specified ensuing steps.

11. A digital integrated circuit according to claim 10, wherein each region has a plurality of sets of input connections corresponding to the sets of output connections respectively and the logical switching circuit includes means for responding to a control signal to select one set of input connections, and wherein the control means is constructed to link the additional region to the chain by addressing a control signal to the logical switching circuit of the preceding region of the chain to select one set of output connections leading to a neighbouring region located in a predetermined direction relative to the preceding region and then by addressing a control signal to the logical switching circuit of the said additional region to select that set of input connections which is connected to the selected set of output connections of the preceding region.

12. A digital integrated circuit according to claim 6, wherein the neighbouring regions of any one region are identified by the directions thereto from the one region, which directions form a cyclic clockwise or anticlockwise sequence, and wherein the control means is constructed to link an additional region to the chain by addressing a control signal to the logical switching circuit of the preceding region of the chain such as to select the set of output connections corresponding to the direction which is next in the cyclic sequence from the direction of the pre-preceding region of the chain relative to the said preceding region, thereby to tend to form a spiral chain of regions.

13. A digital integrated circuit according to claim 10, wherein the neighbouring regions of any one region are identified by the directions thereto from the one region, which directions form a cyclic clockwise or anticlockwise sequence, and wherein the control means is constructed to link an additional region to the chain by addressing a control signal to the logical switching circuit of the preceding region of the chain such as to select the set of output connections corresponding to the direction which is next in the cyclic sequence from the direction of the pre-preceding region of the chain relative to the said preceding region, thereby to tend to form a spiral chain of regions, and wherein the said further region is again in the direction next in the cyclic sequence.

14. A digital integrated circuit according to claim 12, comprising a line for sending synchronizing signals to all regions and wherein each region comprises a direction determining circuit responsive to the synchronizing signals to select the sets of connections in cyclic sequence, corresponding to the cyclic sequence of directions, until the region is incorporated in the chain, and wherein the control means is constructed to select a direction at a region by addressing a control signal thereto at the time that the direction determining circuit is in the state corresponding to the required direction.

15. A digital integrated circuit according to claim 6, wherein each set of input connections and each set of output connections comprise forward connections between which extends a forward data flow path and further comprise return connections between which extends a return data flow path, the logical switching circuits connecting the forward data flow path to the return data flow path so long as a region is not incorporated in the chain other than as the last region thereof.

16. A digital integrated circuit according to claim 15, wherein the digital circuit of each region comprises a shift register and wherein at least one clock signal line for all regions extends thereto over the whole wafer.

17. A digital integrated circuit according to claim 16, wherein each shift register lies wholly within the forward data flow path.

18. A digital integrated circuit according to claim 16, wherein each shift register comprises two portions lying in the forward and return data flow paths respectively.

19. A digital integrated circuit according to claim 16, wherein the shift registers of the chain of regions constitute a succession of word cells in a slow data line and wherein a fast data line extends to each word cell and is linked thereto by logical circuity adapted to compare mask addresses in command signals sent down the fast line with tag addresses in the word cells and to respond to the command signal at the word cell where a mask/tag match occurs to gate a data signal from one line into the other line.

20. A digital integrated circuit according to claim 19, wherein the shift register of each region includes a plurality of word cells.

21. A digital integrated circuit according to claim 19, including further input and output connections in parallel with the aforesaid connections and said further connections to interconnect forward and return fast line data flow paths of the regions.

22. A digital integrated circuit according to claim 21, wherein the regions are arranged in a rectangular array of rows and columns such that each region has four neighbours, the shift registers are controlled by two-phase clock signals supplied to all regions by two clock lines, the signal delay from one region to the next along the fast line being equal to half the period of each clock signal, the regions being identical and the two clock lines extending generally along the rows and/or columns but interchanging with each other in proceeding from one region to the next.

23. A digital integrated circuit according to claim 1, wherein the digital circuit of each region is a shift register and wherein the logical switching circuit of each region is normally effective to connect its shift register in a recirculating loop and to connect its input connections to its output connections directly, but is responsive to a control signal addressed thereto to break the recirculating loop and to connect its input connections to its output connections through the shift register.

24. A digital integrated circuit according to claim 1, wherein a plurality of grids of conductor lines, including two grids for the two terminals of a power supply to the regions, extend across the wafer to all regions, each grid comprising lines in two crossing directions extending to every region in both such directions.

25. A digital integrated circuit according to claim 24, wherein at least one of the grids contains fusible links for fusing in the event of a short-circuit fault to isolate a faulty chip from the grid.

* * * * *

UNITED STATES PATENT OFFICE

CERTIFICATE OF CORRECTION

PATENT NO. : 3,913,072

DATED : October 14, 1975

INVENTOR(S) : Ivor Catt

It is certified that error appears in the above-identified patent and that said Letters Patent are hereby corrected as shown below:

Column 2, line 45, "awafer" should be --a wafer--.

Column 3, line 32, "bot" should be --but--.

Column 5, line 12, "To B" should be --TO B--;

line 40, "to M.N," should be --TO M.N,--.

Column 6, line 67 (twice), "B1T" should be --BIT--.

Column 7, lines 2, 4, 20, 29, 55 , "B1T" should be --BIT--.

Column 10, line 57 , "Inbetween" should be --In between--.

Column 11, line 44, "SIGNAL" should be --signal--.

Column 12, line 2, "mut" should be --must--;

line 22, the equation "$\phi'_2 = \phi_1$" should be --$\phi'_2 = \phi_2$--;

lines 46-47, "SIGNAL" should be --signal--;

line 63, "MISTMATCH" should be --MISMATCH--;

line 66, "ture" should be --true--.

Column 13, line 16, after "if," insert --in--.

UNITED STATES PATENT OFFICE

CERTIFICATE OF CORRECTION

PATENT NO. : 3,913,072

DATED : October 14, 1975

INVENTOR(S) : Ivor Catt

It is certified that error appears in the above-identified patent and that said Letters Patent are hereby corrected as shown below:

Column 14, line 49, add --a-- after the word "is".

Column 16, line 20, "adapted to compare" should be --means for comparing--;

line 22, "to respond" should be --for responding--.

FIG. 6 - In register 13 change "B68" to --B63--.

Signed and Sealed this

Twelfth Day of October 1976

[SEAL]

Attest:

RUTH C. MASON
*Attesting Officer*

C. MARSHALL DANN
*Commissioner of Patents and Trademarks*